United States Patent
Sol

(10) Patent No.: US 9,875,257 B2
(45) Date of Patent: Jan. 23, 2018

(54) MOBILE TERMINAL AND CONTROL METHOD THEREOF, AVN TERMINAL AND CONTROL METHOD THEREOF, AND ROUTE GUIDANCE SYSTEM

(71) Applicant: Hyundai Motor Company, Seoul (KR)

(72) Inventor: Un Hwan Sol, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 92 days.

(21) Appl. No.: 14/752,972

(22) Filed: Jun. 28, 2015

(65) Prior Publication Data

US 2016/0169699 A1    Jun. 16, 2016

(30) Foreign Application Priority Data

Dec. 15, 2014    (KR) ........................ 10-2014-0180218

(51) Int. Cl.
| | | |
|---|---|---|
| *G06F 17/30* | (2006.01) | |
| *G01C 21/36* | (2006.01) | |
| *H04N 7/18* | (2006.01) | |

(52) U.S. Cl.
CPC ..... *G06F 17/30268* (2013.01); *G01C 21/362* (2013.01); *G01C 21/3679* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 7,460,953 B2 | 12/2008 | Herbst et al. | |
| 9,009,265 B2 * | 4/2015 | Zapata | ................ H04L 43/0811 709/219 |
| 2009/0240429 A1 * | 9/2009 | Tanaka | ............... G01C 21/3682 701/533 |

(Continued)

FOREIGN PATENT DOCUMENTS

| | | |
|---|---|---|
| JP | 2005-291885 A | 10/2005 |
| JP | 2006-098250 A | 4/2006 |

(Continued)

OTHER PUBLICATIONS

Gizmodo online article, "Use Geotagged Photos as Waypoints for iPhone Navigation, http://gizmodo.com/5665014/use-geotagged-photos-as-waypoints-for-iphone-navigation", Oct. 17, 2010.*

(Continued)

*Primary Examiner* — Redhwan k Mawari
*Assistant Examiner* — Edward Torchinsky
(74) *Attorney, Agent, or Firm* — Mintz Levin Cohn Ferris Glovsky and Popeo, P.C.; Peter F. Corless

(57) ABSTRACT

A mobile terminal includes: a communication unit communicating with an external device; an image reception judgment unit determining whether an image is received from the external device; a location information extraction unit extracting location information included in an image received from the external device; a vehicle connection judgment unit determining whether the mobile terminal is connected to a vehicle; and a location information transmission unit transmitting the location information to the vehicle via the communication unit when the mobile terminal is connected to the vehicle.

8 Claims, 5 Drawing Sheets

(56) References Cited

U.S. PATENT DOCUMENTS

| | | | |
|---|---|---|---|
| 2014/0297674 A1* | 10/2014 | Rhee | G06F 3/167 707/758 |
| 2014/0321774 A1* | 10/2014 | Klassen | G01S 19/39 382/305 |
| 2016/0117348 A1* | 4/2016 | Reynertson | G06F 17/30268 707/769 |
| 2016/0169699 A1* | 6/2016 | Sol | G01C 21/3679 701/428 |

FOREIGN PATENT DOCUMENTS

| | | |
|---|---|---|
| JP | 2009-210269 A | 9/2009 |
| KR | 10-2008-0004034 A | 1/2008 |
| KR | 10-2008-0027612 | 3/2008 |
| KR | 10-0926681 | 11/2009 |
| KR | 10-2010-0051900 A | 5/2010 |
| KR | 10-2010-0055254 | 5/2010 |
| KR | 10-1077054 | 10/2011 |
| KR | 10-2012-0115827 A | 10/2012 |
| KR | 10-2012-0133635 A | 12/2012 |
| KR | 10-2013-0066848 | 6/2013 |

OTHER PUBLICATIONS

Random Connections Online Blog, http://randomconnections.com/photo-navigation/, Dec. 3, 2008.*

* cited by examiner

MOBILE TERMINAL AND CONTROL METHOD THEREOF, AVN TERMINAL AND CONTROL METHOD THEREOF, AND ROUTE GUIDANCE SYSTEM

CROSS-REFERENCE TO RELATED APPLICATION

This application claims priority to and the benefit of Korean Patent Application No. 10-2014-0180218, filed on Dec. 15, 2014, which is hereby incorporated by reference as if fully set forth herein.

BACKGROUND OF THE DISCLOSURE

Technical Field

The present disclosure relates generally to a mobile terminal and an audio-video-navigation (AVN) terminal and, more particularly, to a mobile terminal and a control method thereof, an AVN terminal and a control method thereof, and a route guidance system.

Discussion of the Related Art

Current mobile terminals feature a diverse range of functionality. Examples of these functions include data and voice communication, camera image capture and video capture, voice recording, music file playback using a speaker system, image or video output using a display unit, and the like. Some terminals are additionally provided with an electronic gaming function or a multimedia player function. In particular, the latest mobile terminals may receive multicast signals that provide visual content such as broadcast and video or television programs. Moreover, mobile terminals are implemented as multimedia players having complex functions such as, for example, still image or moving image capture, music or moving image file playback, gaming, and broadcast reception.

Meanwhile, rapid development of electronic control technology allows a variety of devices in a vehicle, which have conventionally been mechanically operated, to be electrically controlled for the benefit of driver convenience, driving safety, and the like, and also allows in-vehicle systems to be gradually advanced and become state-of-the-art. In this regard, an audio-video-navigation (AVN) terminal may be implemented in a vehicle to provide audio, video, and navigation functions. In addition, the AVN terminal may perform communication with a telematics unit via controller area network (CAN) communication, or may be integrally equipped with a telematics unit. Further, the AVN terminal may be equipped with a display to provide visual information to a user. Generally, the AVN terminal provides a user with guidance, i.e., a recommended route, to a destination.

Conventionally, destination information can be acquired using a global positioning system (GPS) based on information captured by cameras, or by setting a destination in a navigation system by acquiring destination information or additional information from a server. However, there is a demand for technology to allow a mobile terminal connected to a vehicle to receive an image from an external source, to extract specific information from the received image, and to transmit the extracted information to an AVN terminal of the vehicle.

SUMMARY OF THE DISCLOSURE

Accordingly, the present disclosure is directed to a mobile terminal and a control method thereof, an AVN terminal and a control method thereof, and a route guidance system that substantially obviate one or more problems due to limitations and disadvantages of the related art. One object of the present disclosure is to provide a route guidance system in which, when a mobile terminal receives an image including location information, the mobile terminal extracts the location information and transmits point-of interest (POI) information associated with a corresponding location to an AVN terminal, so as to provide a route guidance service. Another object of the present disclosure is to provide a mobile terminal which extracts location information upon receiving an image including the location information and stores information related to at least one POI associated with the location information.

Additional advantages, objects, and features of the present disclosure will be set forth in part in the description which follows and in part will become apparent to those having ordinary skill in the art upon examination of the following or may be learned from practice of the disclosure. The objectives and other advantages of the present disclosure may be realized and attained by the structure particularly pointed out in the written description and claims hereof as well as the appended drawings.

In accordance with embodiments of the present disclosure, a mobile terminal includes: a communication unit communicating with an external device; an image reception judgment unit determining whether an image is received from the external device; a location information extraction unit extracting location information included in an image received from the external device; a vehicle connection judgment unit determining whether the mobile terminal is connected to a vehicle; and a location information transmission unit transmitting the location information to the vehicle via the communication unit when the mobile terminal is connected to the vehicle.

The mobile terminal may further include a validity judgment unit determining whether the received image and the location information included in the image are valid.

The location information transmission unit may be automatically or manually operated.

The vehicle connection judgment unit may control the location information transmission unit so as to directly transmit the location information to the vehicle when the mobile terminal pairs with the vehicle; and control the location information transmission unit so as to transmit the location information to the vehicle via a telematics center when the mobile terminal does not pair with the vehicle.

The mobile terminal may further include an additional information extraction unit extracting at least one of an image reception date, a receiver ID, and sender information from the received image.

The mobile terminal may further include a point-of-interest (POI) database (DB) construction unit constructing a DB of at least one POI associated with the location information based on a predetermined reference.

The POI DB construction unit may construct the DB of the at least one POI based on at least one of a sender, a date, and a location.

The external device may be connected to the terminal via a social network service (SNS).

Furthermore, according to embodiments of the present disclosure, a control method of a mobile terminal includes: determining whether the mobile terminal receives an image from an external device; extracting location information included in an image received from the external device; determining whether the mobile terminal is connected to a vehicle; and transmitting the location information to the vehicle when the mobile terminal is connected to the vehicle.

Furthermore, according to embodiments of the present disclosure, an audio-video-navigation (AVN) terminal includes: a display unit; a modem unit receiving location information from an external device; and a controller providing a route guidance service via the display unit based on the received location information.

The AVN terminal may further include a memory storing the received location information.

The controller may receive information regarding at least one point-of-interest (POI) associated with the location information from the external device; construct a database (DB) of the at least one POI based on at least one of a device ID, a sender, and a date; and control the memory so as to store the DB therein.

The controller may provide a route guidance service to a selected POI in response to a selection of a POI of the at least one POI.

Furthermore, according to embodiments of the present disclosure, a control method of an audio-video-navigation (AVN) terminal includes: receiving information regarding at least one point-of-interest (POI) associated with location information from an external device; and providing a route guidance service to a selected POI in response to a selection of a POI of the at least one POI.

The control method may further include constructing and storing a database (DB) of the at least one POI based on at least one of a device ID, a sender, and a date.

Furthermore, according to embodiments of the present disclosure, a route guidance system includes: an audio-video-navigation (AVN) terminal; and a mobile terminal determining whether an image is received from an external device and extracting location information included in an image received from the external device. The mobile terminal determines whether the mobile terminal is connected to the AVN terminal and transmits the location information to the AVN terminal when the mobile terminal is connected to the AVN terminal, and the AVN terminal receives the location information and provides a route guidance service corresponding to the received location information.

The route guidance system may further include a telematics center. The route guidance system may determine whether the mobile terminal is connected to the AVN terminal and transmit the location information to the telematics center when the mobile terminal is not connected to the AVN terminal, and the telematics center may transmit the location information to the AVN terminal.

The mobile terminal may determine whether the image received from the external device and the location information included in the image are valid.

The route guidance system may directly transmit the location information to the AVN terminal when the mobile terminal pairs with the AVN terminal; and transmit the location information to the AVN terminal via a telematics center when the mobile terminal does not pair with the AVN terminal.

The mobile terminal may extract at least one of an image reception date, a receiver ID, and sender information from the received image.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
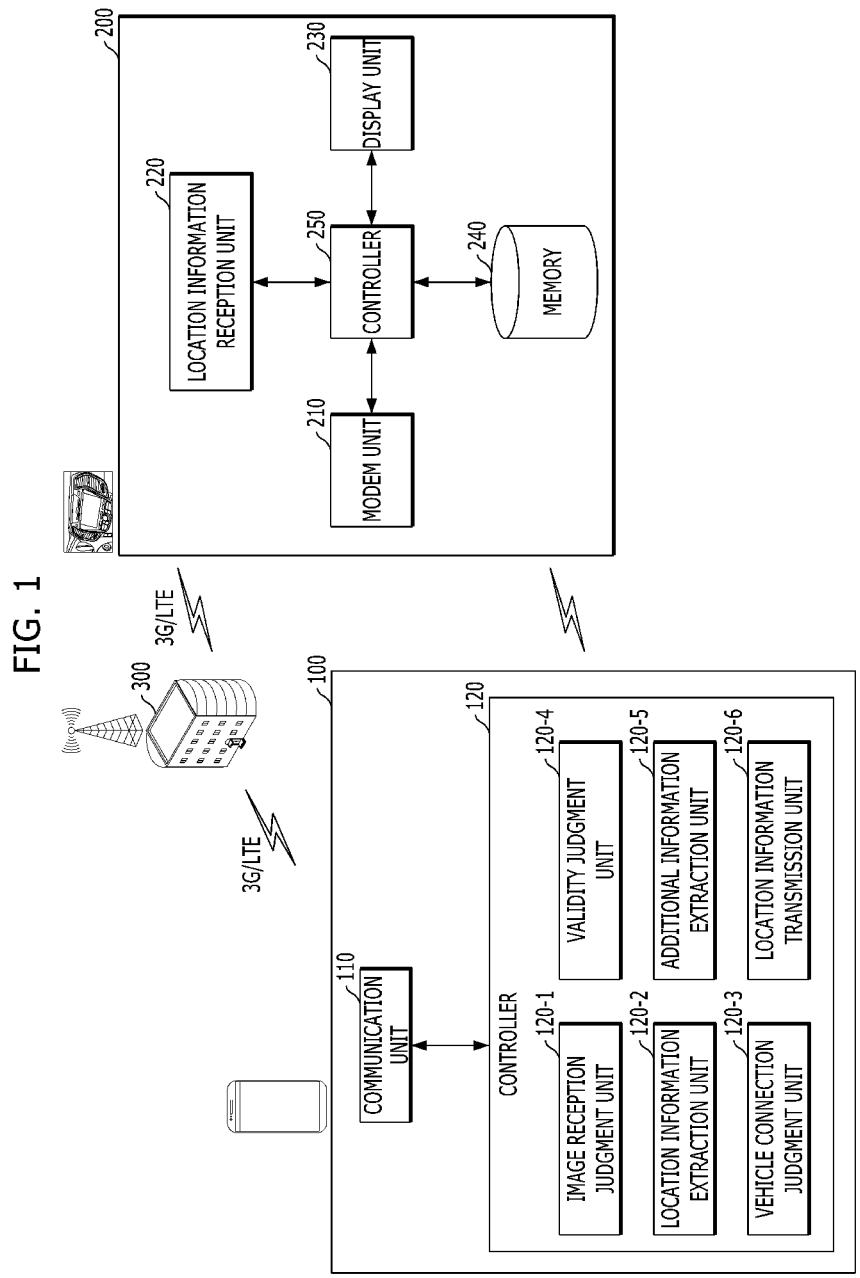
FIG. 1 is a block diagram of an AVN terminal according to embodiments of the present disclosure.

Hereinafter, reference will now be made in detail to the embodiments of the present disclosure, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions. In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions included in the sprit and scope of the present disclosure.

As used herein, the terms including "first," "second," and the like may be used to describe various elements, but the elements are not limited by the terms. The terms, if any, are used for distinguishing between one element and other elements. Further, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when one element is referred to as being "connected to" or "accessed by" another element, one element may be "connected to" or "accessed by" another element via a further element although one element may be directly connected to or directly accessed by another element. On the other hand, it will be understood that when one element is referred to as being "directly connected to" or "directly accessed by" another element, there is no component between the mentioned elements.

The singular forms are intended to include the plural forms as well, unless the context clearly indicates otherwise. The term "comprises" or "has" described herein should be interpreted not to exclude presence or addition possibility of characteristics, numbers, steps, operations, constituent elements, parts or combinations thereof described in the specification but to designate presence of one or more other characteristics, numbers, steps, operations, constituent elements, parts or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, FIG. 1 is a block diagram of an AVN terminal according to embodiments of the present disclosure.

As shown in FIG. 1, the mobile terminal 100 may be connected to a telematics center 300 through a mobile communication network. In addition, the mobile terminal 100 may be connected to an AVN terminal 200 through wired communication, such as USB or serial communication, or wireless communication, such as Bluetooth, Wi-Fi, or Wi-Fi direct communication.

The mobile terminal 100 includes a communication unit 110 and a controller 120. The controller 120 may include an image reception judgment unit 120-1, a location information extraction unit 120-2, a vehicle connection state judgment unit 120-3, a validity judgment unit 120-4, an additional information extraction unit 120-5, and a location information transmission unit 120-6.

The communication unit 110 may transmit and receive wireless signals to and from at least one of a base station, an external terminal, and the telematics center 200 via a mobile communication network that is constructed according to technical standards or communication methods for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

The controller 120 is a controller that controls general operations of the mobile terminal 100 as well as constituent elements of the mobile terminal 100. Functions and characteristics of the aforementioned respective components of the controller 120 including the image reception judgment unit 120-1, location information extraction unit 120-2, vehicle connection state judgment unit 120-3, validity judgment unit 120-4, additional information extraction unit 120-5, and location information transmission unit 120-6 will be described below in detail with reference to FIG. 2.

Although only essential constituent elements of the present disclosure are described herein, the above-described mobile terminal 100 basically includes all required components.

The AVN terminal 200 may include a modem unit 210, a location information reception unit 220, a display unit 230, a memory 240, and a controller 250.

The modem unit 210 may include one or more modules to enable wireless communication between the AVN terminal 200 and a wireless communication system, between the AVN terminal 200 and another telematics terminal, or between the AVN terminal 200 and an external center. In addition, while the modem unit 210 and the location information reception unit 220 have been described separately herein, in some embodiments, the modem unit 210 and the location information reception unit 220 may be incorporated in a telematics unit (not illustrated). In addition, the modem unit 120 may serve as an interface that is connectable to the mobile terminal 100 through Wi-Fi, Bluetooth, and Wi-Fi direct communication and also connectable to the mobile terminal 100 via wired USB communication.

The position information reception unit 220 is a constituent component to acquire a location (or current location) of the AVN terminal 200. For example, through use of the location information reception unit 220, the AVN terminal 200 may acquire a location of the AVN terminal 200 using signals transmitted from GPS satellites.

The display unit 230 may include at least one selected from among a liquid crystal display (LCD), a thin film transistor-liquid crystal display (TFT-LCD), an organic light emitting diode (OLED), a flexible display, a three-dimensional (3D) display, e-ink display, and the like.

The terminal memory 240 stores data to assist various functions of the AVN terminal 200. The memory 240 may store a number of applications that are driven in the AVN terminal 200, and data and commands for operation of the AVN terminal 200. At least some of these applications may be downloaded from an external center via wireless communication. The controller 250 typically controls general operations of the AVN terminal 200 as well as operations related to the applications. The controller 250 may process, for example, signals, data, and information input or output via the aforementioned components, or drive applications stored in the memory 240, so as to provide or process information or functions suitable for a user.

The telematics center 300 may communicate with the mobile terminal 100 (e.g., a 3G/LTE terminal). The telematics sensor 300 may transmit information received from the mobile terminal 100 to the AVN terminal 200.

Figure 2:
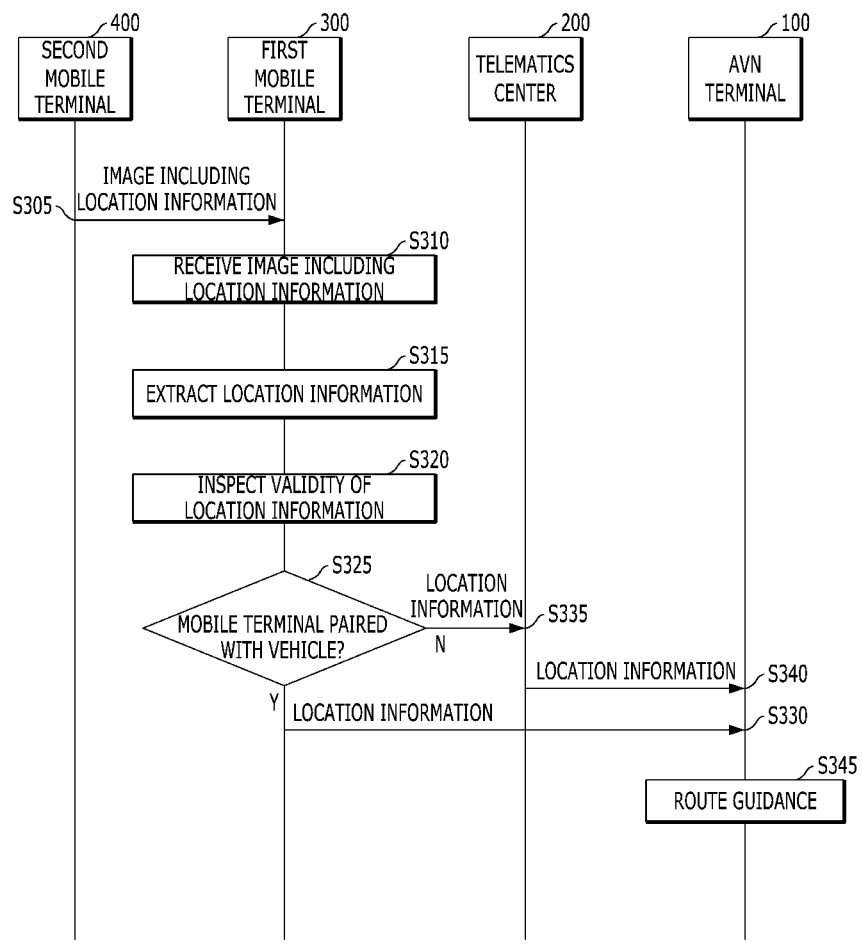
FIG. 2 is a sequence view illustrating a control method of an AVN system according to embodiments of the present disclosure.

FIG. 2 is a sequence view illustrating a control method of an AVN system according to embodiments of the present disclosure.

As shown in FIG. 2, a first mobile terminal 300 may include the communication unit 110 and the controller 120, and the controller 120 may include the image reception judgment unit 120-1, location information extraction unit 120-2, vehicle connection state judgment unit 120-3, validity judgment unit 120-4, additional information extraction unit 120-5, and location information transmission unit 120-6.

First, the communication unit 110 of the first mobile terminal 300 may communicate with an external device (e.g., a second mobile terminal 400). The first mobile terminal 300 may be connected to the second mobile terminal 400 through, for example, mobile communication or SNS.

The second mobile terminal 400 transmits an image including location information to the first mobile terminal 300 (S305). The communication unit 110 of the first mobile terminal 300 receives an image from the second mobile terminal 400. The second mobile terminal 400 may transmit an image or photograph to the first mobile terminal. The image may include a geotagged image. The geotagged image may include location information. The geotagged image may include information received from a GPS.

Subsequently, the image reception judgment unit 120-1 determines whether the first mobile terminal 300 receives an image from the second mobile terminal 400 (S310).

Upon reception of the image from the second mobile terminal 400, the location information extraction unit 120-2 extracts location information included in the received image (S315). For example, the location information extraction unit 120-2 may execute a telematics service application to check Exchangeable Image File (EXIF) information in the received image and to extract geographical information from the EXIF information. The EXIF information may include, for example, an exposure time, ISO sensitivity, focal distance, and aperture adjustment value. In addition, the EXIF information may include location information at the time of image capture. The location information may include GPS information including a longitude, latitude and image capture time, and may include information based on an area name and road name. In addition, the location information extraction unit 120-2 may extract at least one of an image reception date, reception device ID, and sender information from the received image. The first mobile terminal 300 may additionally provide various functions. For example, through provision of pop-up menus, the first mobile terminal 300 may additionally provide an image photo-album storage function and an image e-mail transmission function.

Subsequently, the validity judgment unit 120-4 inspects whether the extracted location information is valid (S320). In addition, the validity judgment unit 120-4 may determine whether the image including the location information is valid. The validity judgment unit 120-4 may output an error message when the extracted location information is not valid. The first mobile terminal 300 may update the location information. Such update of the location information may be performed on the basis of a user who has transmitted the image, or a date or location when or where image transmission has implemented.

Subsequently, whether the first mobile terminal 300 is connectable to a vehicle is determined (S325). The first mobile terminal 300 may pair with the vehicle. Specifically, the first mobile terminal 300 may pair with the vehicle through near field mobile communication such as, for example, Wi-Fi or Bluetooth, or through wired communication such as, for example, USB or serial communication. Connection between the first mobile terminal 300 and the vehicle means pairing between the first mobile terminal 300 and an AVN terminal of the vehicle.

In addition, a point-of-interest (POI) DB construction unit (not illustrated) of the first mobile terminal 300 may construct a DB of at least one POI associated with the location information based on a predetermined reference. Specifically, the POI DB construction unit may construct the DB based on at least one of a sender who has transmitted the location information, and a date and location when or where information transmission has implemented.

Subsequently, upon success of pairing between the first mobile terminal 300 and the vehicle, the location information transmission unit 120-6 may directly transmit the location information to the vehicle. Upon failure of pairing between the first mobile terminal 300 and the vehicle, the location information transmission unit 120-6 may indirectly transmit the location information to the vehicle by way of the telematics center 200. Here, the location information transmission unit 120-6 may be automatically or manually operated. The first mobile terminal 300 may transmit the location information through, for example, a preinstalled telematics center application (e.g., Bluelink or UVO). The POI DB construction unit (not illustrated) may construct at least one POI associated with the location information and transmit the same to the vehicle.

Subsequently, upon transmission of the location information to the AVN terminal 100, the AVN terminal 100 that has received the location information from the external device may provide a route guidance service through the display unit based on the received location information (S345). When the AVN terminal 100 receives the at least one POI information, the AVN terminal 100 may display the POI information and may provide route guidance to the selected POI in response to user selection.

Figure 3:
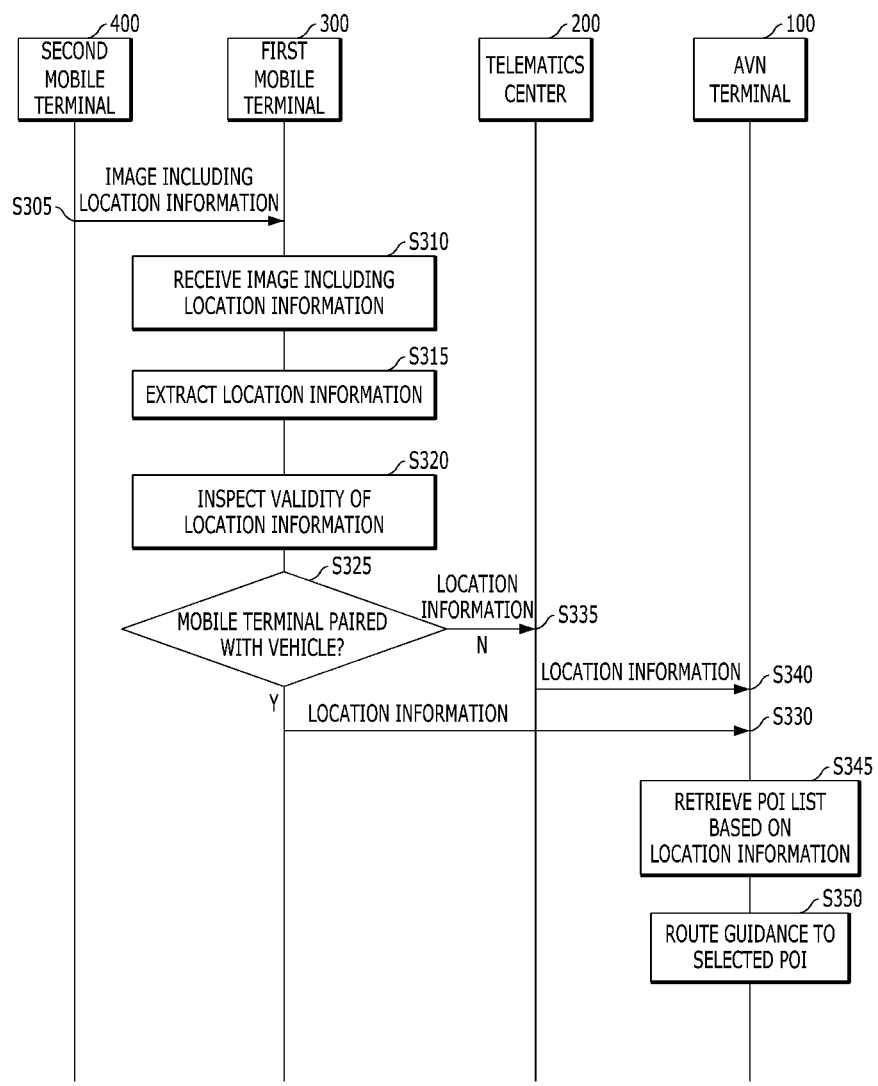
FIG. 3 is a sequence view illustrating a control method of an AVN system according to embodiments of the present disclosure.

FIG. 3 is a sequence view illustrating a control method of an AVN system according to embodiments of the present disclosure.

As shown in FIG. 3, steps before Step 345 are identical to those of FIG. 2 and a description thereof will be omitted herein.

While POI DB construction has been described in FIG. 2 as being implemented by the first mobile terminal 300, this function may be implemented by the AVN terminal 100 as described below with reference to FIG. 3.

The AVN terminal 100 may receive location information and construct a POI list based on the location information. The AVN terminal 100 may construct a DB of at least one POI based on at least one of a device ID, a sender, and a date. In addition, the AVN terminal 100 may construct the DB of at least one POI based on at least one of a sender, a date and a location.

On the other hand, the telematics center 200 may produce a POI list based on location information. In a case in which the telematics center 200 produces a POI list, the best route guidance service that reflects a current traffic situation may be provided.

Meanwhile, the first mobile terminal 300 may provide storage and e-mail transmission functions of an image including location information. In particular, the first mobile terminal 300 may store images and location information on a per sender category or location category basis.

Figure 4:
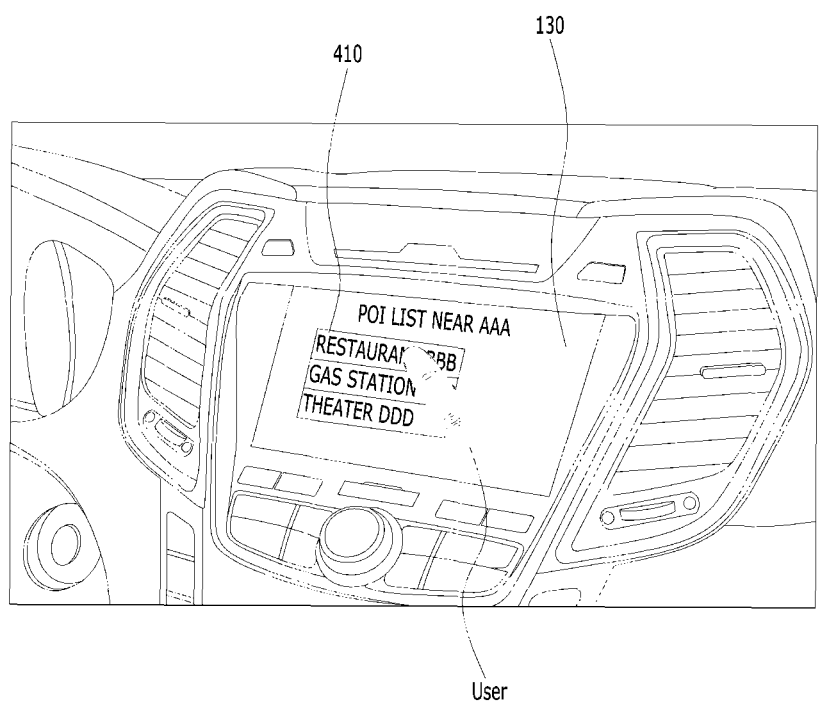
FIG. 4 is a view illustrating display of a POI list on an AVN terminal according to embodiments of the present disclosure.

FIG. 4 is a view illustrating display of a POI list on an AVN terminal according to embodiments of the present disclosure.

As shown in FIG. 4, the AVN terminal 100 extracts location information "AAA" from an image including the received location information on the display unit 130 and displays a list of POIs located near a corresponding location "AAA".

When a restaurant "BBB" is selected from the POI list 410 by a user input, the AVN terminal 100 may provide a corresponding service. One example of this service is a route guidance service. This will be described now in more detail.

Figure 5:
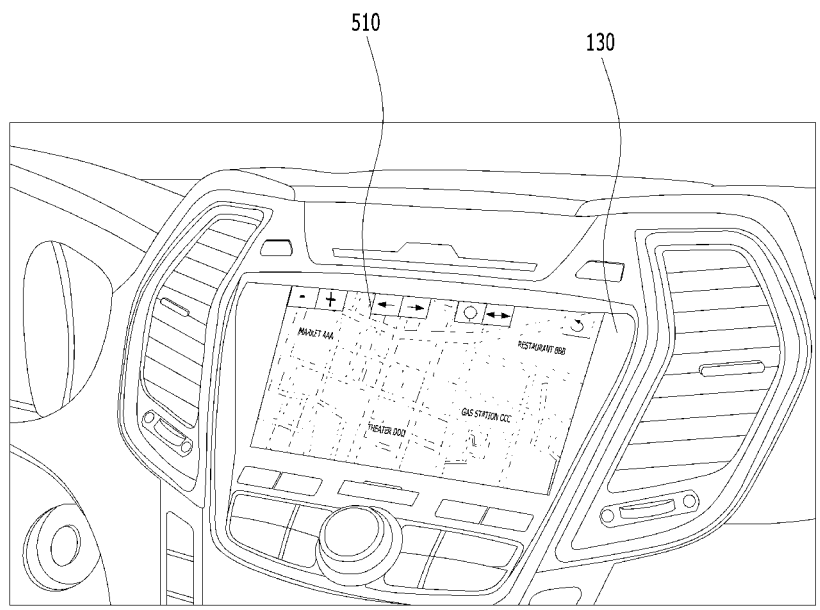
FIG. 5 is a view illustrating an AVN terminal that provides a route guidance service upon selection of a POI in FIG. 4.

FIG. 5 is a view illustrating an AVN terminal that provides a route guidance service upon selection of a POI in FIG. 4.

As shown in FIG. 5, the AVN terminal 100 may provide a route guidance service with respect to the selected restaurant "BBB". In addition to providing the route guidance service, the AVN terminal 100 may further retrieve and display information related to the restaurant "BBB" as well as reputation thereof.

As is apparent from the above description, according to embodiments of the present disclosure, when a mobile terminal receives an image including location information, POI information associated with a corresponding location may be provided via an AVN terminal, which may enhance user convenience. In addition, when a mobile terminal receives an image including location information, the mobile terminal may extract the location information and store information related to at least one POI associated with the location information, thereby providing enhanced user convenience.

It will be appreciated by persons skilled in the art that the effects that can be achieved through the present disclosure are not limited to what has been particularly described hereinabove and other advantages of the present disclosure will be more clearly understood from the above detailed description.

The present disclosure as described above may also be implemented as a computer readable code of a computer readable medium in which programs are recorded. The computer readable medium includes all kinds of recording devices in which data that may be read by a computer system is stored. Examples of the computer readable medium may include a hard disk drive (HDD), a solid state disk (SSD), a silicon disk drive (SDD), ROM, a RAM, a CD-ROM, a magnetic tape, a floppy disk, and an optical data storage device. In addition, the computer readable recording medium includes a carrier wave (e.g., data transmission over the Internet).

Accordingly, the above detailed description is not intended to be construed to limit the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. A mobile terminal comprising:
a transceiver configured to communicate with an external device via a wired or wireless connection and to receive a geotagged image from the external device via the connection, wherein the geotagged image has an Exchangable Image File (EXIF) format that includes location information including at least one of: GPS information, an area name, and a road name;
a memory configured to store program instructions; and
a processor configured to execute the stored program instructions, which when executed cause the processor to:
determine whether the geotagged image is received from the external device;
in response to determining that the geotagged image is received from the external device, extract the location information included in the geotagged image received from the external device;
determine whether the location information is valid;
in response to determining that the location information is valid, update the location information based on at least one of: a user who has transmitted the geotagged image, a date when the geotagged image is transmitted, and a location where the geotagged image is transmitted;
control the memory to store the location information;
determine whether the mobile terminal is connected to a vehicle via a wired or wireless connection; and
control the transceiver to transmit the location information to the vehicle when the mobile terminal is determined to be connected to the vehicle,
wherein, when the location information is received at the vehicle, an audio-video-navigation (AVN) terminal of the vehicle provides a route guidance service based on the location information.

2. The mobile terminal according to claim 1, wherein the transceiver transmits the location information to the vehicle automatically or in response to manual operation.

3. The mobile terminal according to claim 1, wherein the processor is further configured to:
directly transmit the location information to the vehicle when the mobile terminal pairs with the vehicle; and
transmit the location information to the vehicle via a telematics center when the mobile terminal does not pair with the vehicle.

4. The mobile terminal according to claim 1, wherein the processor is further configured to extract at least one of an image reception date, a receiver ID, and sender information from the received image.

5. The mobile terminal according to claim 1, wherein the processor is further configured to construct a database (DB) of at least one POI associated with the location information based on a predetermined reference.

6. The mobile terminal according to claim 5, wherein the processor is further configured to construct the DB of the at least one POI based on at least one of a sender, a date, and a location.

7. The mobile terminal according to claim 1, wherein the external device is connected to the terminal via a social network service (SNS).

8. A control method of a mobile terminal including a transceiver, a memory, and a processor, the control method comprising:
communicating, by the transceiver, with an external device via a wired or wireless connection;
receiving, by the transceiver, a geotagged image from the external device via the connection, wherein the geotagged image has an Exchangable Image File (EXIF) format that includes location information including at least one of: GPS information, an area name, and a road name;
determining, by the processor, whether the mobile terminal receives the geotagged image from the external device;
in response to determining that the geotagged image is received from the external device, extracting, by the processor, the location information included in the geotagged image received from the external device;
determining, by the processor, whether the location information is valid;
in response to determining that the location information is valid, updating, by the processor, the location information based on at least one of: a user who has transmitted the geotagged image, a date when the geotagged image is transmitted, and a location where the geotagged image is transmitted;

controlling, by the processor, the memory to store the location information;
determining, by the processor, whether the mobile terminal is connected to a vehicle via a wired or wireless connection; and
controlling, by the processor, the transceiver to transmit the location information to the vehicle when the mobile terminal is determined to be connected to the vehicle,
wherein, when the location information is received at the vehicle, an audio-video-navigation (AVN) terminal of the vehicle provides a route guidance service based on the location information.

\* \* \* \* \*